Figure 1:
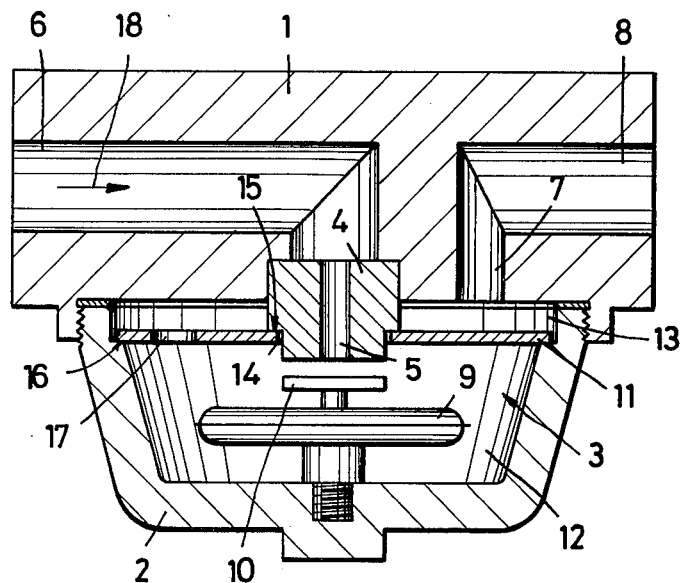

United States Patent [19]

Werner

[11] 4,023,730
[45] May 17, 1977

[54] STEAM TRAP

[75] Inventor: Föller Werner, Stuhr, Germany

[73] Assignee: Gestra-KSB Vertriebsgesellschaft mbH & Co. Kommanditgesellschaft, Bremen, Germany

[22] Filed: Aug. 27, 1975

[21] Appl. No.: 608,121

[30] Foreign Application Priority Data

Oct. 2, 1974 Germany ............................ 2447031

[52] U.S. Cl. ................................................. 236/58
[51] Int. Cl.² ............................................ F16T 1/04
[58] Field of Search ................................. 236/56–59

[56] References Cited
UNITED STATES PATENTS

| 630,308 | 8/1899 | Bayley | 236/56 |
| 652,562 | 6/1900 | Lyon | 236/57 |
| 1,222,272 | 12/1871 | Maxim | 236/58 |

Primary Examiner—William E. Wayner
Attorney, Agent, or Firm—Allison C. Collard

[57] ABSTRACT

A steam trap comprising a housing forming a low pressure chamber and an inlet opening and an outlet opening and a valve seat formed at the inlet opening. A thermal control device filled with an expansion medium is disposed in the low pressure chamber, and includes a locking part for the valve seat actuated by the thermic control device. A separating wall divides the low pressure chamber into two chambers, one of which is connected to the inlet opening and containing the control means, the other of which is connected with the outlet opening. The separating wall has a porthole positioned on another side of the control device with respect to the outlet opening in radial and/or axial direction relative thereto.

6 Claims, 2 Drawing Figures

STEAM TRAP

The present invention relates to steam traps.

In steam traps having a housing with a low pressure chamber and associated inlet and outlet openings, and a thermal control element filled with an expansion medium, whereby the control element is provided in the low pressure chamber and actuates a locking part which cooperates with a valve seat at the inlet openings of the low pressure part, the thermal control element is provided behind the shut-off point viewed in flow direction, i.e., at the low pressure end. The control element here controls the inlet openings, but not the outlet opening of the inner housing space. Hence, the latter is always open. In order to assure an orderly operation of the steam trap, the control element must be immersed into the condensate, and therefore a corresponding condensate reservoir must be present in the inner housing space. This can be realized in that the mounting of the steam trap in the pipe line is done in the following manner. The outlet opening of the inner housing space is located above the control element, which usually may be achieved with a horizontal drainage as well as in an upwardly directed drainage. However, the freedom of installing the steam trap is somewhat restricted. In a drainage flow directed downwardly in a perpendicular direction, the outlet opening is positioned below the control element. Therefore, the inner space of the housing can run empty.

It is therefore an object of the present invention to improve the steam traps of the aforementioned type in that the required steam reservoir is assured, and yet there exists a substantial freedom with respect to the installation of the steam trap.

The separating wall provided between the control element and the outlet opening of the low pressure chamber, with the through-flow opening offset with respect to the outlet opening, substantially assures the required condensate reservoir for the control element, even if the outlet opening is positioned below the control element.

A particularly simple and advantageous embodiment which permits construction of the steam trap, not possible with known devices, and which needs only low cost changes in construction which adjust to the required requirements, is provided by the present invention. This is also true with respect to steam traps, whereby the control element is normally psoitioned at the high pressure end, and which operate contrary to the normal through flow direction, so that the same device is usable in low pressure end devices, as well as with high pressure end devices, having a choice of installing the control element either below or above the outlet opening.

Still a further freedom of installation with respect to installing the steam trap is assured by the invention with respect to the aforementioned advantages. Axial flexibility of the separating wall is achieved by an embodiment of the invention, which permits compensation of the finished tolerances between the length of the separating wall element and the installation length in the housing.

Other objects and features of the present invention will become apparent from the following detailed description when taken in connection with the accompanying drawing which discloses several embodiments of the invention. It is to be understood that the drawing is designed for the purposes of illustration only, and is not intended as a definition of the limits and scope of the invention disclosed.

Figure 2:
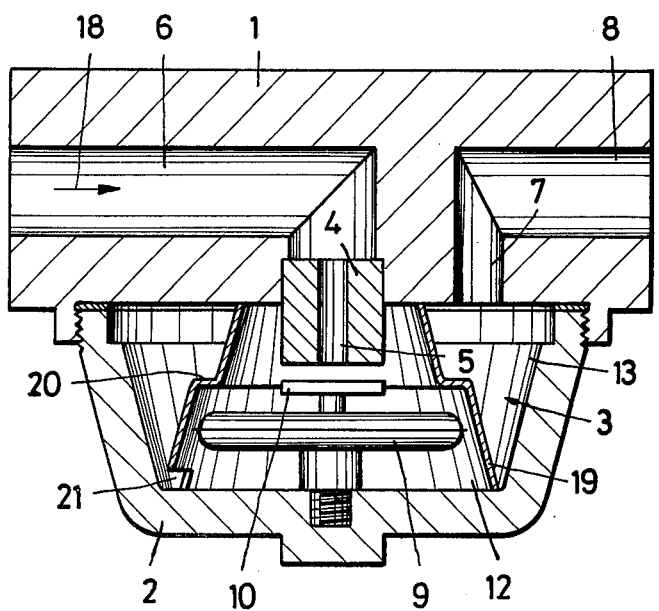

In the drawing, wherein similar reference numerals denote similar elements throughout the several views:

FIG. 1 is a longitudinal sectional view of an inventive steam trap with separating wall in accordance with the present invention; and FIG. 2 is a different embodiment of the steam trap.

Referring to the drawings, FIG. 1 shows a two compartment steam trap housing 1, 2 with a low pressure chamber 3. A valve seat bushing jacket 4 extends into the low pressure chamber and is provided with an inlet opening 5. The low pressure chamber 3 is connected through inlet opening 5 with an inlet channel 6 in the housing portion. The low pressure chamber 3 is also connected with an outlet channel 8 in the housing portion 1 by means of an outlet opening 7. A thermal control element 9 filled with an expansion medium is mounted on the bottom of housing portion 2, and the control element carries a locking portion 10 which controls inlet opening 5. A separating sheet metal disk 11 is provided in low pressure chamber 3, which separates the low pressure chamber into two chambers 12 and 13. Chamber 13 is connected with outlet opening 7, while chamber 12 is connected with inlet opening 5 and receives control element 9. In order to connect chamber 12 and inlet opening 5, the sheet metal disk 11 is provided with a central bore 14 through which the free end of the valve seat element 4 extends. The sheet metal disk 11 sealingly engages with its bore edge on an axial annular surface 15 of valve seat element 14 and with its outer edge on an axial annular surface 16 of the housing portion 2. Finally, the sheet metal disk 11 is provided with a porthole 17 which permits a connection between the two chambers 12 and 13. This porthole opening is positioned on the other side of the control element from the outlet opening 7 seen in radial direction of the control element 9.

FIG. 1 shows the installation position with horizontal through flow 18, whereby the outlet opening 7 of the low pressure chamber 3 is above the control element 9. The inlet opening 7 is also above the control element 9 if the through flow 18 is directed from below. Therefore, the inner chamber of the housing is not idle, but is filled with condensate and the control element 9 is immersed in condensate as required.

Due to the arrangement of the sheet metal disk 11 with the special porthole 17 it is now also possible to use the shown steam trap for through flow 18 from above. The chamber 12 of the low pressure chamber 3 remains in this installation filled with condensate above control element 9 due to porthole opening 17. Because of this, the control element 9 is completely immersed in condensate.

In the embodiment according to FIG. 2, the separating wall which seaprates the low pressure chamber 3 is in the form of a cone shaped pipe element 19 which sealingly engages housing portions 1 and 2 at each end, or a component connected therewith. The pipe element is provided with a step-like shoulder 20 which permits the axial flexibility. Therefore, finsihing tolerances between the construction length of the pipe element 19 and the installation length in housing 1 and 2 may be compensated. The porthole opening 21 is defined by pipe element 19 from outlet opening 7, as well as in radial and axial direction viewed with respect to the control element 9, i.e., beyond the control element 9. Besides the advantages mentioned with respect to FIG. 1, in a horizontal through flow, the housing portion 2 may not only be positioned below but above. Therefore, all types of installation possibilities are available for the steam trap of the invention.

Naturally, the invention is not limited to steam traps having coaxial or parallel running inlet or outlet channels, but it may be used with steam traps having, for example, right angular positioned connections. Therefore, in operation the steam trap operates as follows:

When chamber 12 is filled with condensate and the control element 9 is subjected to the condensate temperature, locking portion 10 is in its open position as shown in FIGS. 1 and 2. Therefore, condensate can flow through inlet channel 6 into chamber 12. Simultaneously, a corresponding quantity of condensate flows through the porthole inlet and porthole openings 17 or 21, respectively, into chamber 13 and into outlet channel 8. Thereby, due to admixture of the inflowing medium with the condensate which is already in chamber 12, a medium exchange occurs in chamber 12, because of the low positioned flow-through openings 17 or 21, respectively. Thereby, a change in temperature of the inflowing medium takes place followed by a corresponding change in temperature in chamber 12 and at the control element 9.

When steam penetrates into chamber 12, the chamber temperature exceeds the provided limit value, creating an expansion of control element 9, due to the expansion medium. Thereby, locking member 10 is brought into sealing engagement with the valve seat, so that an out-flowing of steam from the steam trap is prevented.

As is common with thermically controlled steam traps, the steam trap opens when the temperature in chamber 12 falls below the allowable limit value due to heat given off to the outside, so that a contraction of the control element 9 occurs.

While only one embodiment of the present invention has been shown and described, it will be obvious to those skilled in the art that many changes and modifications may be made thereto without departing from the spirit and scope of the invention.

What is claimed is:

1. A steam trap comprising:
   a housing forming a low pressure chamber and having an inlet and outlet openings thereto, said low pressure chamber being adapted to be filled with condensate;
   a valve seat formed at the inlet opening of said low pressure chamber;
   thermal control means filled with an expansion medium and disposed in said low pressure chamber, said control means being completely immersed in the condensate and including a locking member for actuation by said thermal control means cooperating with said valve seat; and
   a separating wall independant of said thermal control means dividing said low pressure chamber into two chambers, said separating wall having a porthole, one of said two chambers being connected to said inlet opening and containing said control means, the other of said two chambers being connected with said outlet opening, said separating wall assuring that said thermal control means is constantly immersed in the condensate, said porthole being positioned on another side of said control means with respect to said outlet opening in a radial and axial direction relative to said control element.

2. The steam trap, according to claim 1 wherein said separating wall comprises a sheet metal disk formed with a central bore through which said valve seat extends, one portion of said sheet metal disk being held in position adjacent said central bore sealingly engaging said valve seat and an outer edge of said sheet metal disk sealingly engaging said housing.

3. The steam trap, according to claim 1, wherein said separating wall comprises a pipe element radially encompassing said control element, and having two ends sealingly mounted operatively to said housing.

4. The steam trap according to claim 3, wherein said pipe element is formed with a step-like shoulder means for axial flexibility.

5. The steam trap according to claim 1 wherein said separating wall has an inner end portion forming a central bore through which said valve seat extends, said inner end portion directly engages said housing.

6. The steam trap according to claim 1 wherein said separating wall has an inner end portion forming a central bore through which said valve seat extends, said inner end portion directly engages said valve seat.

* * * * *

UNITED STATES PATENT OFFICE
CERTIFICATE OF CORRECTION

Patent No. 4,023,730     Dated May 17, 1977

Inventor(s) Werner Föller

It is certified that error appears in the above-identified patent and that said Letters Patent are hereby corrected as shown below:

Page 1, correct the applicant's name to read --WERNER FÖLLER--

Signed and Sealed this twenty-sixth Day of July 1977

[SEAL]

Attest:

RUTH C. MASON
*Attesting Officer*

C. MARSHALL DANN
*Commissioner of Patents and Trademarks*